US006897575B1

(12) United States Patent
Yu

(10) Patent No.: US 6,897,575 B1
(45) Date of Patent: May 24, 2005

(54) PORTABLE WIND POWER APPARATUS FOR ELECTRIC VEHICLES

(76) Inventor: Xiaoying Yu, 24685 Heather Heights Rd., Saratoga, CA (US) 95070

( * ) Notice: Subject to any disclaimer, the term of this patent is extended or adjusted under 35 U.S.C. 154(b) by 156 days.

(21) Appl. No.: 10/414,754

(22) Filed: Apr. 16, 2003

(51) Int. Cl.[7] .................................................. B60K 1/00
(52) U.S. Cl. ........................... 290/44; 290/55; 180/65.3
(58) Field of Search ............................. 290/44, 43, 54, 290/55; 180/165, 65.3

(56) References Cited

U.S. PATENT DOCUMENTS

| | | | |
|---|---|---|---|
| 452,546 A | 5/1891 | Mitchel | |
| 757,800 A | 4/1904 | Williams | |
| 2,145,511 A | 1/1939 | Grohmann | |
| 3,374,849 A | 3/1968 | Redman | |
| 3,556,239 A | 1/1971 | Spahn | |
| 3,876,925 A | 4/1975 | Stoeckert | |
| 4,423,368 A | 12/1983 | Bussiere | |
| 5,280,827 A | * 1/1994 | Taylor et al. | 180/165 |
| 5,287,004 A | * 2/1994 | Finley | 290/55 |
| 5,296,746 A | 3/1994 | Burkhardt | |
| 5,680,032 A | 10/1997 | Pena | |
| 5,920,127 A | 7/1999 | Damron et al. | |

FOREIGN PATENT DOCUMENTS

| | | |
|---|---|---|
| CA | 2.296.794 | 7/2001 |
| WO | WO 03/008223 A1 | 1/2003 |

* cited by examiner

*Primary Examiner*—Nicholas Ponomarenko
(74) *Attorney, Agent, or Firm*—Michael I Kroll

(57) ABSTRACT

A device for converting wind energy into electrical energy for powering a vehicle, the device including a wind turbine positioned on the vehicle and a generator positioned within the vehicle and connected between the wind turbine and systems of the vehicle. When the vehicle is in motion, wind impinges on the wind turbine and causes the wind turbine to rotate. The generator converts rotational energy of the wind turbine into electrical energy. The electrical energy is provided to power the systems of the vehicle and the batteries of the vehicle are recharged.

19 Claims, 12 Drawing Sheets

PORTABLE WIND POWER APPARATUS FOR ELECTRIC VEHICLES

BACKGROUND OF THE INVENTION

1. Field of the Invention

The present invention relates generally to a vehicle and, more specifically, to an electric vehicle that utilizes wind to rotate turbines for converting the energy of the wind into electrical energy. The electrical energy is used to provide power to the vehicle as well as to charge and recharge power cells within the vehicle causing the vehicle to selectively move along a desired path.

2. Description of the Prior Art

Numerous other types of electric vehicles exist in the prior art. Prior art electric vehicles include power cells therein for powering a vehicle to move as well as to provide power to operate all sub-systems, such as heat, A/C, and radio, contained within the vehicle. These systems are generally not able to store a sufficient amount of electrical energy to allow the vehicle to be operated as it was designed and the stored energy supply is usually quickly depleted. Therefore, the owners of these vehicles are required to use additional external sources of energy to recharge the power cells contained within these vehicles.

Additionally, alternative power sources such as fuel cells and solar power have been incorporated into vehicles in order to reduce the reliance on gasoline powered vehicles. These methods of providing energy are not universally viable. In the case of solar power, the solar panels cannot capture enough energy from the sun to maintain sufficient power in non-sunny conditions thereby restricting the use of these vehicles to specific geographic locales and times of day. Fuel cells are also not practical as due to the water byproduct formed when employing these types of power sources. Vehicles that are used in extreme cold could not function properly with these fuel cells as the byproduct would freeze and render the vehicle inoperable.

Attempts have been made to solve these defects by producing vehicles or portable power apparatuses for electric vehicles that have power cells which can be recharged while the vehicle is in motion. However, no self-recharging mechanism known in the prior art is able produce enough power to be a viable alternative. While these self recharging mechanisms may be suitable for the purposes for which they were designed, they would not be as suitable for the purposes of the present invention, as hereinafter described.

Numerous other wind driven device designed for electric vehicles are provided in the prior art. Typical of these is U.S. Pat. No. 452,546 issued to Mitchell on May 19, 1891.

Another patent was issued to Williams on Apr. 19, 1904 as U.S. Pat. No. 757,800. Yet another U.S. Pat. No. 2,145,511 was issued to Grohmann on Jan. 31, 1939 and still yet another was issued on Mar. 26, 1968 to Redman as U.S. Pat. No. 3,374,849.

Another patent was issued to Spahn on Jan. 19, 1971 as U.S. Pat. No. 3,556,239. Yet another U.S. Pat. No. 3,876,925 was issued to Stoeckert on Apr. 8, 1975. Another was issued to Bussiere on Dec. 27, 1983 as U.S. Pat. No. 4,423,368 and still yet another was issued on Mar. 22, 1994 to Burkhardt as U.S. Pat. No. 5,296,746.

Another patent was issued to Pena on Oct. 21, 1997 as U.S. Pat. No. 5,680,032. Yet another U.S. Pat. No. 5,920,127 was issued to Damron et al. on Jul. 6, 1999. Another was issued to Apruzzese on Jul. 13, 2001 as Canadian Patent No. 2,296,794 and still yet another was issued on 30 Jan. 2003 to Wang as WIPO Patent No. WO03/008223.

While these electric vehicles may be suitable for the purposes for which they were designed, they would not be suitable for the purposes of the present invention, as hereinafter described.

U.S. Pat. No. 452,546

Inventor: James M. Mitchell

Issued: May 19, 1891

In a mechanism for generating electricity, the combination; with a drum or casing, of a wind-wheel shaft journaled in the same, a field-magnet surrounding said shaft, an armature and commutator of a dynamo mounted on said shaft, a pivoted support for the casing, conductors connecting the brushes of the dynamo with the device in which the current is used, and means whereby the wind-wheel shall be presented to the action of shifting currents of air without interrupt in the flow of the current, substantially as described.

U.S. Patent Number 757,800

Inventor: Joseph J. Williams

Issued: Apr. 19, 1904

In a wind-motor, a moving part having impact-surfaces, a casing inclosing said part, a nozzle connected with the casing and arranged to direct air-currents against said surfaces, a movable vane exposed to the air-currents, a plurality of generators operatively connected with the moving part and means, between the vane and generators for controlling the operation of the latter.

U.S. Pat. No. 2,145,511

Inventor: Benjamin F. Grohmann

Issued: Jan. 31, 1939

In a device of the character described, a support, means mounted on the support for free rotation thereon, a generator mounted on said means, a wind wheel shaft mounted on said means, a wind wheel on one end of said shaft, power transmission mechanism connecting said shaft with the generator, a vertical shaft journaled on said means adjacent said generator, a contact brush mounted on said vertical shaft for movement into and out of engagement with an armature of said generator, an arm secured to said vertical shaft and extending at right angles thereto, a wind vane pivoted on the free end of said arm and including a lug on the pivoted end thereof, and an expansion spring engaging the lug and arm for urging the vane in a direction opposite to the direction of the wind, said lug coacting with the arm in limiting the pivotal movement of the vane in one direction.

U.S. Pat. No. 3.374,849

Inventor: Lawrence E. Redman

Issued: Mar. 26, 1968

In a vehicle having a frame and a pair of driving wheels, an electric motor mounted on said frame and connected to said wheels for rotatably driving same, a support mounted on each said of said vehicle frame, a bank of batteries in each support, an air scoop at the forward end of said frame, an enlongated housing communicating with said scoop, a plurality of turbine elements positioned in said housing for rotation therein, a plurality of alternators driven by said turbine elements and control means for connecting said electric motor to one of said bank of batteries for driving said vehicle while connecting the other bank of batteries to said alternators for replenishing the charge in said other bank of batteries upon the rotation of said turbine elements.

U.S. Pat. No. 3,556,239

Inventor: Joseph W. Spahn

Issued: Jan. 19, 1971

A battery powered automobile includes an air operated turbine fed by front and side air scoops for providing both charging current to the batteries and driving power for the automobile. An auxiliary internal combustion engine is included for use when necessary. Deceleration and wind sensitive controls operate door structure on the front air scoop so that it opens, increasing drag, only under predetermined conditions. Braking energy is utilized to help charge the batteries.

U.S. Pat. No. 3,876,925

Inventor: Chrisian Stoeckert

Issued: Apr. 8, 1975

In a wind turbine driven generator for the recharging of batteries utilized as the power source for various vehicles, and particularly an automotive electrically driven vehicle, the mechanical combination wherein wind driven vanes of particular design are mounted to rotate about a vertical shaft disposed in or on the roof of the vehicle, said vanes being completely enclosed within a suitable housing of either rectangular or circular configuration. When of rectangular shape the housing has at least four air current receiving openings, one on each side, each of which do in turn serve as exhaust outlets depending on direction of predominant air pressure, and, when of circular configuration, the housing has but one air current receiving vent, with that vent revolving to face the direction of any wind current by the impetus of a wind vane on the top thereof. In either case the arrangement is such that the said wind driven vanes rotate while the vehicle is under way, or, if air currents are prevalent, even while the vehicle is not in motion, thus to drive a suitably mounted generator for more or less continuous recharge of the battery system. Said generator is mounted within the hub around which said vanes rotate, and comprises a stationary stator, and rotating rotor, the latter being wind driven by the rotating vanes.

U.S. Pat. No. 4,423,368

Inventor: Jean L. Bussiere

Issued: Dec. 27, 1983

An automobile is provided with a wind driven electric generator. An air duct extends from an inlet along the roof section of the body above the windshield and over the passenger compartment to air outlets located in the fender wells of the automobile rear section. Air turbines, operatively connected to electric generators, are positioned at the air outlets and are driven by air currents flowing from the duct.

U.S. Pat. No. 5,296,746

Inventor: Harry E. Burkhardt

Issued: Mar. 22, 1994

The invention is to a wind charging system for an automobile which includes a wind driven turbine blade that is attached to a plurality of alternators by a gearing system. The gearing system includes a large gear driving a plurality of small gears, each attached to an alternator. The system is mounted in a single frame that mount in the engine compartment of a standard automobile.

U.S. Pat. No. 5,680,032

Inventor: Mario Pena

Issued: Oct. 21, 1997

During forward motion of an electrically-powered vehicle, air is captured at the front of the vehicle and channeled to one or more turbines. The air from the turbines is discharged at low pressure regions on the sides and/or rear of the vehicle. The motive power of the air rotates the turbines, which are rotatably engaged with a generator to produce electrical energy that is used to recharge batteries that power the vehicle. The generator is rotatably engaged with a flywheel for storing mechanical energy while the vehicle is in forward motion. When the vehicle slows or stops, the flywheel releases its stored energy to the generators, thereby enabling the generator to continue recharging the batteries. The flywheel enables the generators to provide a more stable and continuous current flow for recharging the batteries.

U.S. Pat. No. 5,920,127

Inventor: Philip C. Darmron et al.

Issued: Jul. 6, 1999

This invention relates to a multibladed (three or more) small diameter propeller as being included in an apparatus consisting of the single unenclosed propeller, extension shaft, armature shaft, and generator; such apparatus to be mounted on top of an electric vehicle to transform wind energy into electrical energy for feeding such energy into the battery pack as the vehicle is being driven forward, such energy to augment the stored voltage potential of the battery pack.

Canadian Patent Number 2,296,794

Inventor: Mario Apruzzese

Issued: Jul. 13, 2001

The present invention is an electric vehicle having a chassis, drive wheels, an internal combustion engine and an electric motor. The vehicle has a controller coupled to the electric motor and the internal combustion engine for selectively controlling their operation and a storage battery for supplying electric power. The vehicle includes a wind energy converting mechanism coupled to the storage battery for converting a flow of air created by the motion of the vehicle into electric to recharge the storage battery. The wind energy converting mechanism may consist of at least one wind turbine coupled to an electric generator. The wind turbine may be mounted to the chassis such that the turbine is exposed to the flow of air. The vehicle may have a wind channeling device for guiding the flow of air towards the wind turbine, preferably, the wind channeling device consists of a cowl having a opening, an exit and an interior passage, the opening and exit positioned to allow the air to flow through the passage, the turbine positioned within the passage. The opening of the cowl may be positioned to collect the air deflected by the vehicle, and the cowl may even form part of the vehicle's roof. Preferably, the opening of the cowl is oriented towards the front of the chassis and the exit is positioned towards the back of the chassis.

WIPO Patent Number WO03/008223

Inventor: Jar Chen Wang

Issued: 30 Jan. 2003

An electric vehicle having a steering assembly, a front wheel assembly, and an electric drive assembly. The steering assembly includes a rotatably mounted steering shaft and a steering handle mounted at an upper end of the steering shaft. The front wheel assembly includes a base member attached to a lower end of the steering shaft, a pair of front wheels and a transmission operatively associated with the front wheels and configured for propelling the vehicle by driving the pair of front wheels when the steering shaft is rotated in an oscillating manner. The electric drive assembly includes a driving disc connected to an output shaft of an electric motor, a driven disc coaxially mounted on the steering shaft and a driving arm having a first end rotatably connected to the driving disc and a second end rotatably connected to the driven disc for converting rotary movement of the driving selectively connects the driving arm to the driven disc. The vehicle is adapted to be manually propelled when the driving arm is disconnected from the driven disc and the steering handle is rotated in an oscillating manner by a user. The vehicle is adapted to be propelled by the electric motor when the driving arm is connected to the driven disc.

SUMMARY OF THE PRESENT INVENTION

The present invention relates generally to a vehicle and, more specifically, to an electric vehicle that utilizes wind to rotate turbines for converting energy of the wind into electrical energy. The electrical energy is used to provide power to the vehicle as well as to charge and recharge power cells within the vehicle causing the vehicle to selectively move along a desired path. Additionally, the system can be made portable so as to allow flexibility in manufacturing.

A primary object of the present invention is to provide a wind energized electric vehicle that is able to overcome the short comings of the prior art.

Another object of the present invention is to provide a wind energized electric vehicle that utilizes the wind to generate electrical energy to provide power to and to recharge power cells contained within the vehicle.

Yet another object of the present invention is to provide a wind energized electric vehicle having a plurality of wind turbines positioned on the roof of a vehicle that are caused to rotate by wind impingent upon the vehicle.

Another object of the present invention is to provide a wind energized electric vehicle whereby the wind turbines positioned on the roof of the vehicle are covered thereby allowing the wind to be concentrated around the turbines and faster rotation of the turbines.

Still another object of the present invention is to provide a wind energized electric vehicle containing wind turbines that are selectively removable from the roof of the vehicle for upgrade and modification without changing the structure of the electric vehicle, which is inexpensive to manufacture and easy to operate.

Another object of the present invention is to provide a wind energized electric vehicle that is formed integrally with the outer body of the vehicle to ensure the design of the vehicle is aerodynamic.

Still another object of the present invention is to provide a wind energized electric vehicle that converts the rotational energy created by the rotating turbines into a current for powering and recharging power cells used to operate the vehicle.

A further object of the present invention is to provide a wind energized electric vehicle that can be used in air transportation for powering airplanes.

An even further object of the present invention is to provide a wind energized electric vehicle that can be used in rail transportation for powering locomotives.

Yet another object of the present invention is to provide a wind energized electric vehicle that is simple and easy to use.

Additional objects of the present invention will appear as the description proceeds. The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
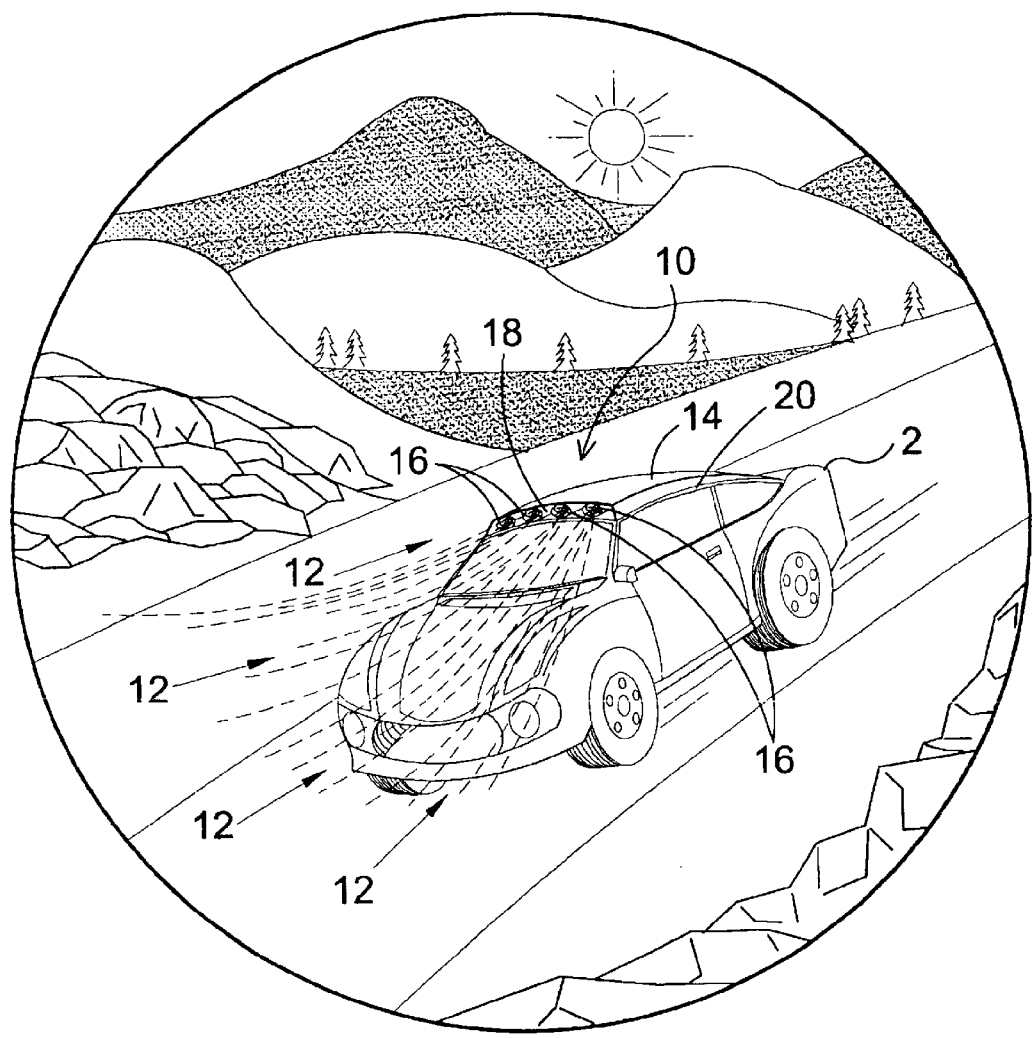
FIG. 1 is an illustrative view of the portable wind power apparatus of the present invention in use.

Turning now descriptively to the drawings, in which similar reference characters denote similar elements throughout the several views, the Figures illustrate the wind energized electric vehicle of the present invention. With regard to the reference numerals used, the following numbering is used throughout the various drawing figures.

2 vehicle
4 hood of the vehicle
6 windshield
10 wind energized electric vehicle of the present invention
11 directional arrow indicating vehicle direction
12 wind
14 wind apparatus cover
16 wind turbine
17 rotational direction of wind turbine
18 opening of the wind apparatus cover
19 second opening of wind apparatus
20 vehicle roof
22 gear box
24 generator
26 battery charger
28 inverter
30 DC motor
32 driving wheel
33 speed sensor
34 sensor controller
35 temperature sensor
36 rotor
37 rotational direction of the rotor
38 current
39 first magnet
40 phase generator coils
41 second magnet
42 rectify diode
43 induction motor
50 connectors
52 connector ports

DETAILED DESCRIPTION OF THE PREFERRED EMBODIMENTS

The following discussion describes in detail one embodiment of the present invention. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 12 illustrate a portable wind power apparatus of the present invention indicated generally by the numeral 10.

FIG. 1 is an illustrative view of the portable wind power apparatus of the present invention in use. The portable wind power apparatus 10 is shown positioned at a top of a roof 20 of a vehicle 2. The vehicle 2 is an electric powered vehicle. As will be described hereinafter, the apparatus 10 utilizes wind 12 impingent on the vehicle 2 in order to provide power to the vehicle 2 having an electric motor as well as to recharge power cells which power the electric vehicle 2. The wind 12 is identified by the dashed lines labeled with the reference numeral 12. The apparatus 10 includes a plurality of wind turbines 16 and a housing 14 surrounding the wind turbines 16. The housing 14 includes a first opening 18. The wind turbines 16 are positioned at the first opening. The first opening 18 allows wind to impact the wind turbines 16. A second opening 19 is positioned on a side of the housing 14 opposite the first opening 18 for allowing the wind passing through the housing 14 to flow out from the housing 14.

As shown in FIG. 1, the vehicle 2 is moving along a roadway in a direction indicated by the arrow labeled D. As the vehicle 2 is moving in the direction D, wind 12 is shown blowing against the vehicle 2. The wind 12 enters the first opening 18 of the housing 14 of the apparatus 10. Upon entering the opening 18, the wind 12 contacts the plurality of wind turbines 16 causing the plurality of wind turbines 16 to rotate. Additionally the housing 14 of the apparatus 10 functions to concentrate the wind 12 received through the opening 18 in order to increase the speed of rotation of the wind turbines 16. Upon rotation of the wind turbines 16, power is provided to the vehicle as will be discussed hereinafter with specific reference to FIGS. 5–11. The rotational energy of the wind turbines 16 are used to provide power to the vehicle 2 so that it operates in the manner in which it was designed to operate and in order to ensure that the electric motor of the vehicle 2 remains charged.

Figure 2:
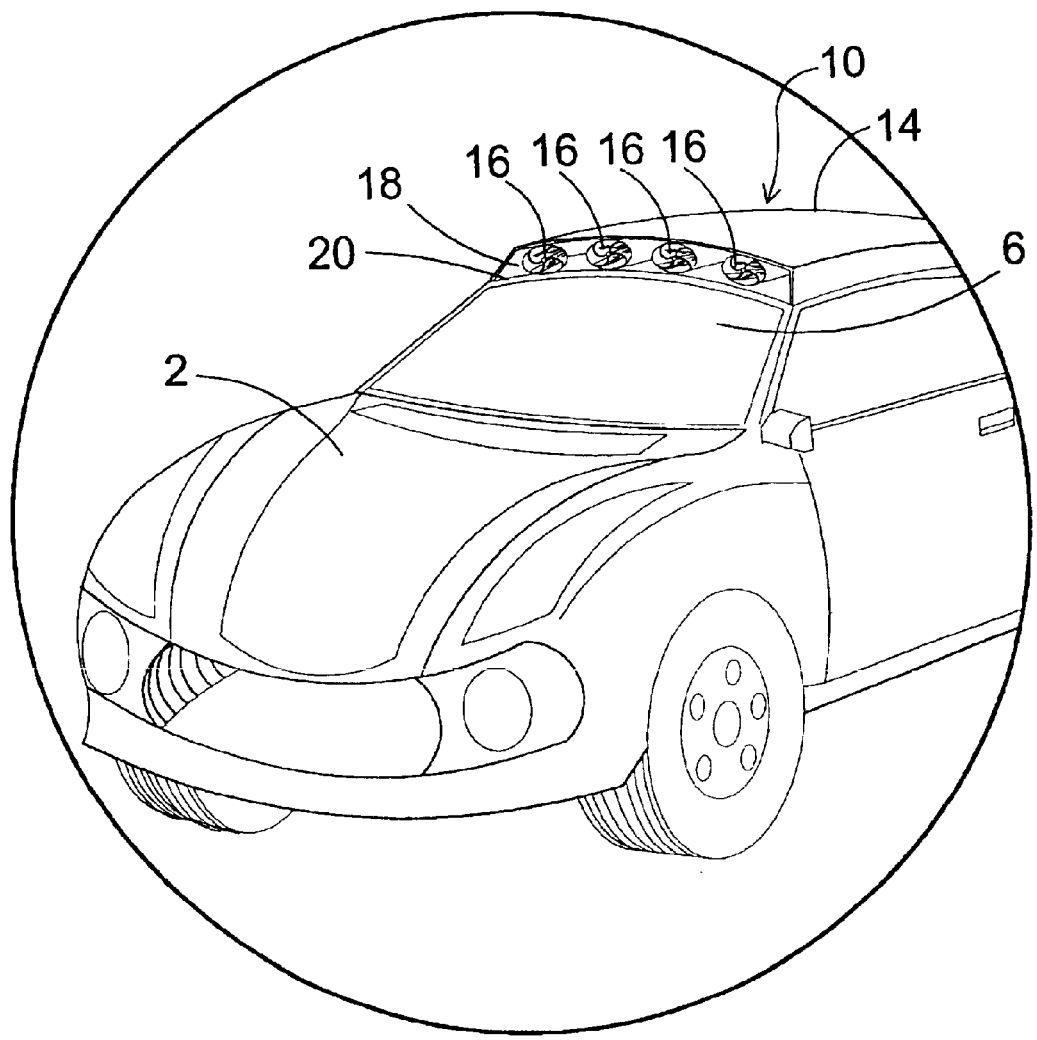
FIG. 2 is an is a front perspective view of the portable wind power apparatus of the present invention showing wind turbines positioned on a roof thereof.

FIG. 2 is an is a front perspective view of the portable wind power apparatus of the present invention showing wind turbines positioned on a roof thereof. The vehicle is shown having the portable wind power apparatus 10 positioned on the roof 20 thereof. The apparatus 10 can be made integral with the vehicle 2 or can be selectively removeable from the vehicle as shown in FIG. 12. The apparatus 10 includes a plurality of wind turbines 16 positioned within the housing 14 thereof. The housing 14 has the first opening 18 for receiving wind 12 there through and allowing the wind turbines 16 to be rotated by the wind 12. The plurality of wind turbines 16 are freely rotatable upon contact by wind 12 as is shown in FIG. 1. Wind 12 passing over a hood 4 and a windshield 6 of the vehicle 2 is directed into the opening 18 of the housing 14 wherein the wind is concentrated within the housing 14 and causes the turbines 16 to rotate thereby causing power to be provided to the vehicle 2 as will be discussed hereinafter with specific reference to FIGS. 5–11.

Figure 3:
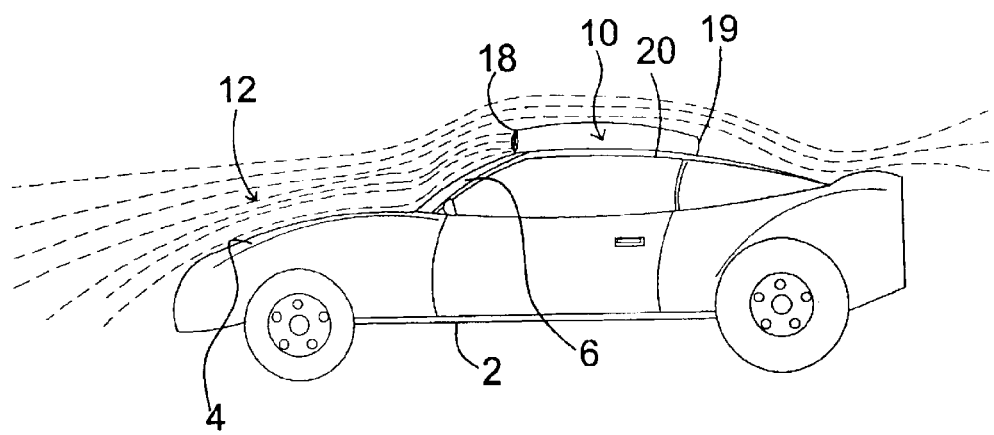
FIG. 3 is a side view of the portable wind power apparatus of the present invention showing the path of the wind along the outer body thereof.
Figure 4:
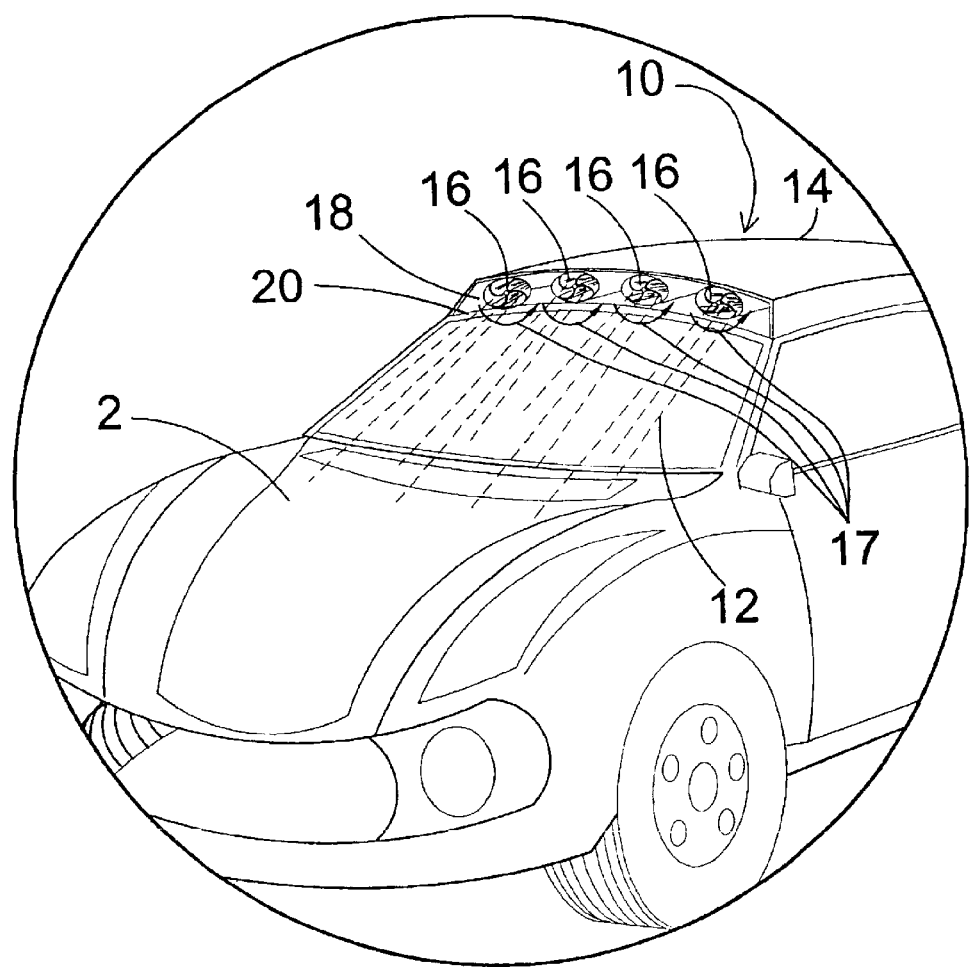
FIG. 4 is a front perspective view of the portable wind power apparatus of the present invention showing wind turbines being rotated by incoming wind.

FIG. 3 is a side view of the portable wind power apparatus of the present invention showing the path of the wind along the outer body thereof. The vehicle is shown having the portable wind power apparatus 10 positioned on the roof 20 thereof. The apparatus 10 can be made integral with the vehicle 2 or can be selectively removeable from the vehicle as shown in FIG. 12. The apparatus 10 includes a plurality of wind turbines 16, as shown in FIGS. 1 and 2, positioned within the housing 14 thereof. The housing 14 includes the first opening 18 for receiving wind 12 there through and allowing wind to impact the wind turbines 16 and the second opening 19 positioned on a side of the housing 14 opposite the first opening 18 for allowing the wind to flow out from the housing 14. FIG. 3 shows how the wind 12, upon contacting the vehicle 2, is received by the apparatus 10 of the present invention. Upon contacting the vehicle 2, the wind flows over the contour of the vehicle in accordance with the properties of aerodynamics. The wind 12 is directed by the hood 4 of the vehicle to the windshield 6 of the vehicle. The wind 12 contacting the windshield 6 of the vehicle is then guided into the first opening 18 of the housing 14. Upon entering the housing 14, the wind 12 causes the plurality of turbines 16 to rotate as is shown in FIG. 4. FIG. 3 shows the wind tracing the outer contour of the vehicle 2 the shape of the housing 14 allows the vehicle to remain aerodynamic and does not cause any unwanted drag by the addition of the apparatus to the vehicle 2. As all vehicles are shaped differently, the housing 14 of the apparatus 10 can be designed to maintain the desired aerodynamic shape of any vehicle 2 to which the apparatus may be attached.

FIG. 4 is a front perspective view of the portable wind power apparatus 10 of the present invention showing wind turbines 16 being rotated by incoming wind 12. The vehicle 2 is shown having the portable wind power apparatus 10 positioned on the roof 20 thereof. The apparatus 10 can be made integral with the vehicle 2 or can be selectively removeable from the vehicle as shown in FIG. 12. The apparatus 10 includes a plurality of wind turbines 16 positioned within the housing 14 thereof. The housing 14 has the first opening 18 for allowing the wind turbines 16 to be rotated by the wind 12. The plurality of wind turbines 16 are freely rotatable upon contact by wind 12 as is shown in FIG. 1. The wind 12 passes over the hood 4 and windshield 6 of the vehicle 2 into the first opening 18 of the housing 14 wherein the wind 12 is concentrated within the housing 14 and causes the turbines 16 to rotate thereby causing power to be provided to the vehicle 2 as will be discussed hereinafter with specific reference to FIGS. 5–11.

FIG. 4 shows a directional rotation indicated by arrows labeled with the numeral 17 of the wind turbines 16 of the apparatus 10 of the present invention. The wind 12 is shown contacting the vehicle 2 and entering the first opening 18 of the housing 14. Upon entering the housing 14 the wind 12 contacts the turbines 16 and causes them to rotate in the direction of arrows 17. Rotation of the turbines 16 causes the power to be provided to both operate the vehicle 2 as well as recharge the electric power cells of the vehicle so as to maintain optimal functionality thereof. The rotational energy generated by the rotation of the wind turbines 16 is transferred into electrical energy and current in a manner which will be discussed hereinafter with specific reference to FIGS. 5–11.

Figure 5:
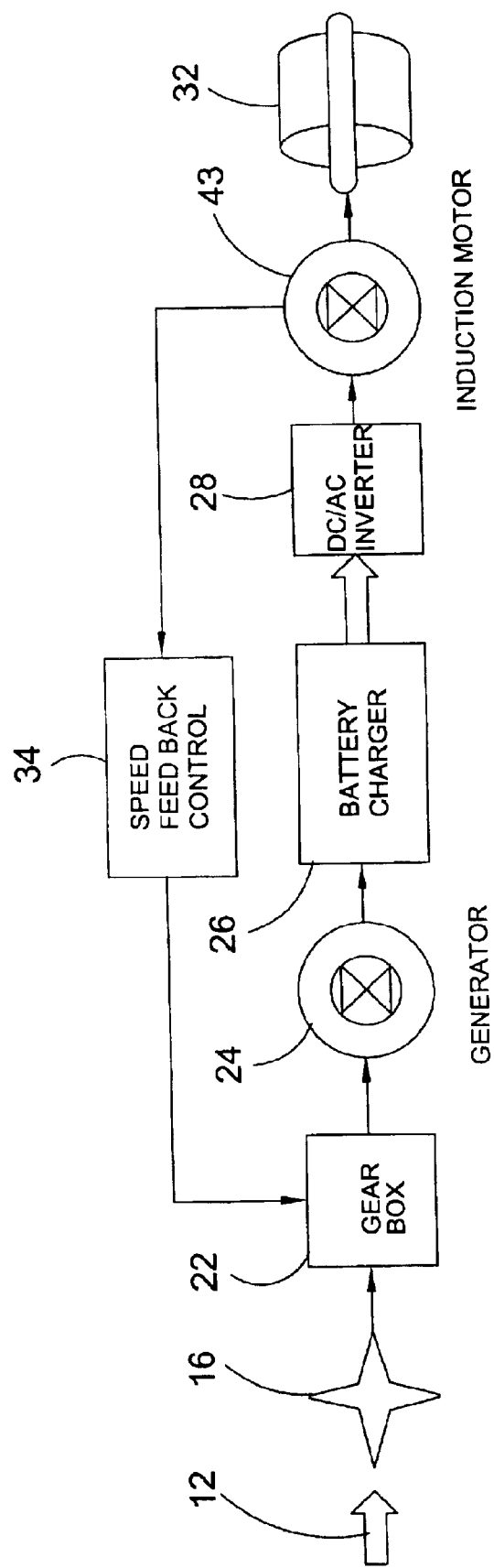
FIG. 5 is a block diagram of the portable wind power apparatus of the present invention.

FIG. 5 is a block diagram of the portable wind power apparatus of the present invention. Shown is the wind 12 contacting the wind turbines 16 of the vehicle and causing the wind turbines 16 to rotate as is shown in FIG. 4. Upon rotation of the turbines 16, rotational energy is generated. The vehicle includes a gear box 22 connected between a generator 24 and the wind turbines 16. The rotational energy generated by the turbines 16 flows through the gear box 22 and causes rotation of a rotor of the generator 24. The generator 24 converts the rotational energy from the wind turbines 16 into electrical energy in a known manner. The gear box 22 is provided to control the rotation of the rotor and thus the conversion of the rotational energy into electrical energy. Upon generating the electrical energy, the generator 24 transfers the energy produced to a battery charger 26 connected to the generator 24. The battery charger 26 is connected to a DC/AC Inverter 28 which converts the DC current into AC current. The battery charger 26 also diverts some energy received from the rectifier 24 to the power cells (not shown) of the vehicle for purposes of recharging. Connected to the inverter 28 is an induction motor 43. Upon receipt of the current from DC to AC inverter, the induction motor 43 provides power to the vehicle via a driving wheel 32 connected thereto.

A feedback control device 34 is connected between the induction motor 43 and the gearbox 22. The feedback control device 34 is able to determine the speed and temperature of the induction motor 43 according to the method shown and described hereinafter with specific reference to in FIG. 8. Upon determining the speed of the induction motor 43 and the temperature of the batteries, the feedback control devices causes the gears contain within the gear box 22 to be shifted accordingly. Thereafter, the operation of the generator 24 can be controlled such that if the temperature or speed are above a predetermined level, the gear box will shift gears and the generator 24 is caused to power off, thus reducing the temperature and/or speed of the vehicle. The feedback control device 34 helps prevent the induction motor 43 from burning out and overheating of the generator maintains the vehicles safe operation.

Figure 6:
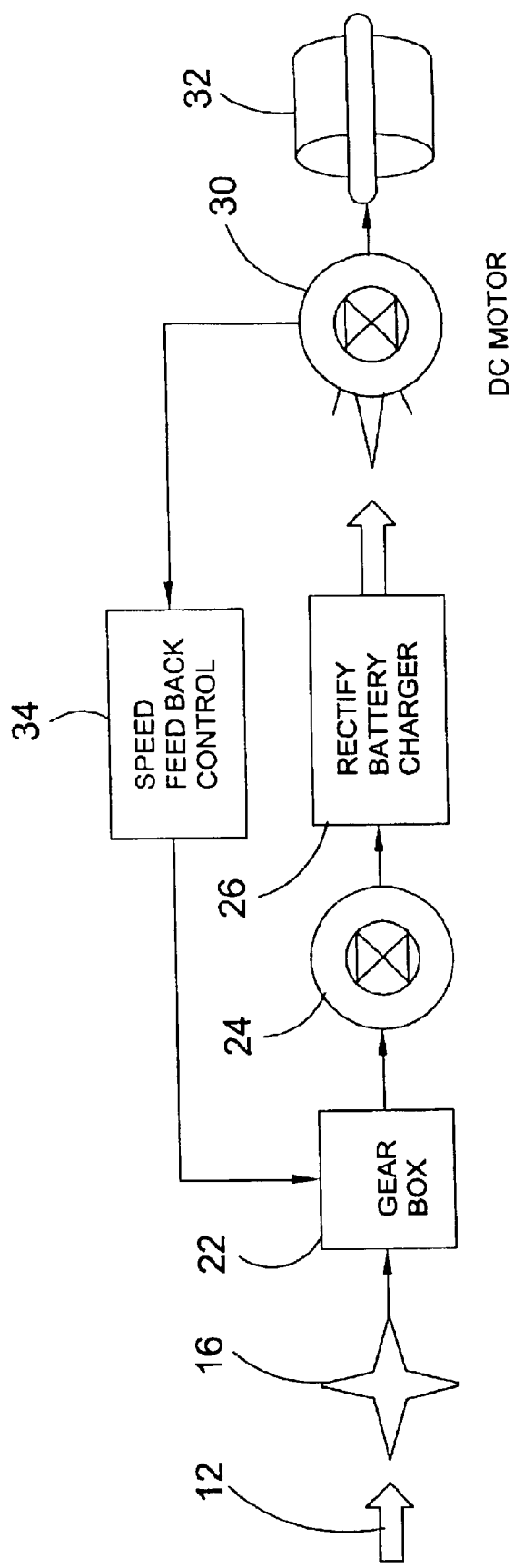
FIG. 6 is a block diagram of the portable wind power apparatus of the present invention that can be added to a vehicle after the manufacture of the vehicle.

FIG. 6 is a block diagram of the portable wind power apparatus of the present invention that can be added to a vehicle after the manufacture of the vehicle wherein the vehicle only contains a DC Motor. Shown is the wind 12 contacting the wind turbines 16 of the vehicle and causing the wind turbines 16 to rotate as is shown in FIG. 4. Upon rotation of the turbines 16, rotational energy is generated. The vehicle includes a gear box 22 connected between a generator 24 and the wind turbines 16. The rotational energy generated by the turbines 16 flows through the gear box 22 and causes rotation of a rotor of the generator 24. The generator 24 converts the rotational energy from the wind turbines 16 into electrical energy in a known manner. Upon the gear box 22 is provided to control the rotation of the rotor and thus the conversion of the rotational energy into electrical energy generating the electrical energy, the generator 24 transfers the energy produced to a battery charger 26 connected to the rectifier in FIG. 10. The battery charger 26 is connected to a DC/AC Inverter 28 which converts the DC current into an to AC current. The battery charger 26 also diverts some energy received from the generator 24 to the power cells (not shown) of the vehicle for purposes of recharging. Connected to the inverter 28 is an AC motor 43. Upon receipt of the current from DC to AC inverter, the AC motor 43 is induced to provide power to a driving wheel 32 which is connected to the AC motor 43. Upon providing power to the AC motor 43, the motor causes the vehicle to be operated by driving the driving wheel 32.

A feedback control device 34 is connected between the induction motor 43 and the gearbox 22. The feedback control device 34 is able to determine the speed and temperature of the DC or AC motor 30 or 43, respectively, according to the method shown and described herein after with specific reference to FIG. 8. Upon determining the speed and the temperature of the induction motor 43, the feedback control devices causes the gears contain within the gear box 22 to be shifted accordingly. Thereafter, the operation of the generator 24 can be controlled such that if the temperature or speed are above a predetermined level, the generator 24 is caused to power off, thus reducing the temperature and/or speed of the vehicle. The feedback control device 34 helps prevent the generator and DC motor 30 from burning out.

Figure 7:
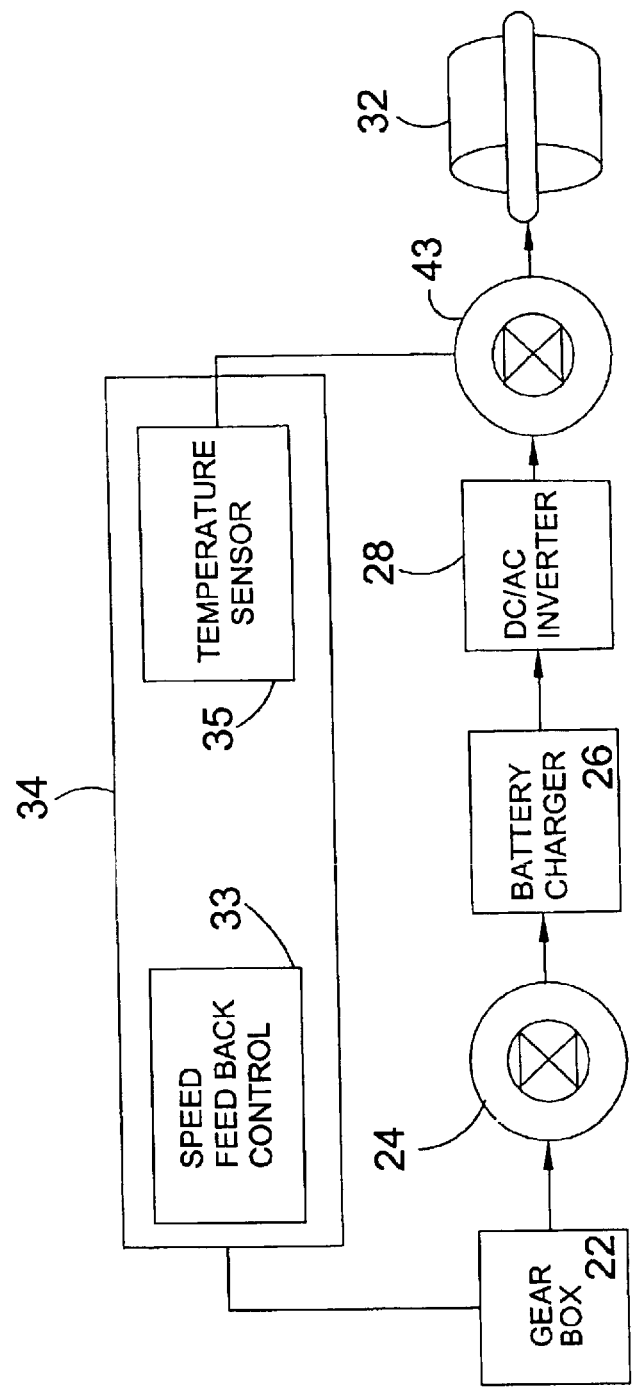
FIG. 7 is a block diagram of the portable wind power apparatus of the present invention showing the speed and temperature sensing mechanism.

FIG. 7 is a block diagram of the portable wind power apparatus of the present invention showing the speed and temperature sensing mechanism. The feedback control device 34 includes a speed sensor 33 and a temperature sensor 35. The speed sensor 33 detects and monitors the speed of the induction motor 43. If the speed of the induction motor 43 is above a predetermined level associated with the gear in which the vehicle is currently operating, the speed sensor 33 causes the gear box 22 to shift gears into a higher gear thereby preventing the induction motor from being burned out. The temperature sensor 35 detects the temperature level of the vehicle motor and charging the batteries. If the temperature level is above a predetermined level, the temperature sensor causes the generator 24 to be powered down thereby reducing the operating speed of the motor and thus the temperature level.

As described in FIG. 7 is a feedback control system in an electric vehicle with an induction motor 43 used to drive the driving wheel 32 of the vehicle. However, feedback control system as described above can be used in an electric vehicle having a DC motor 30 as shown in FIG. 6.

Figure 8:
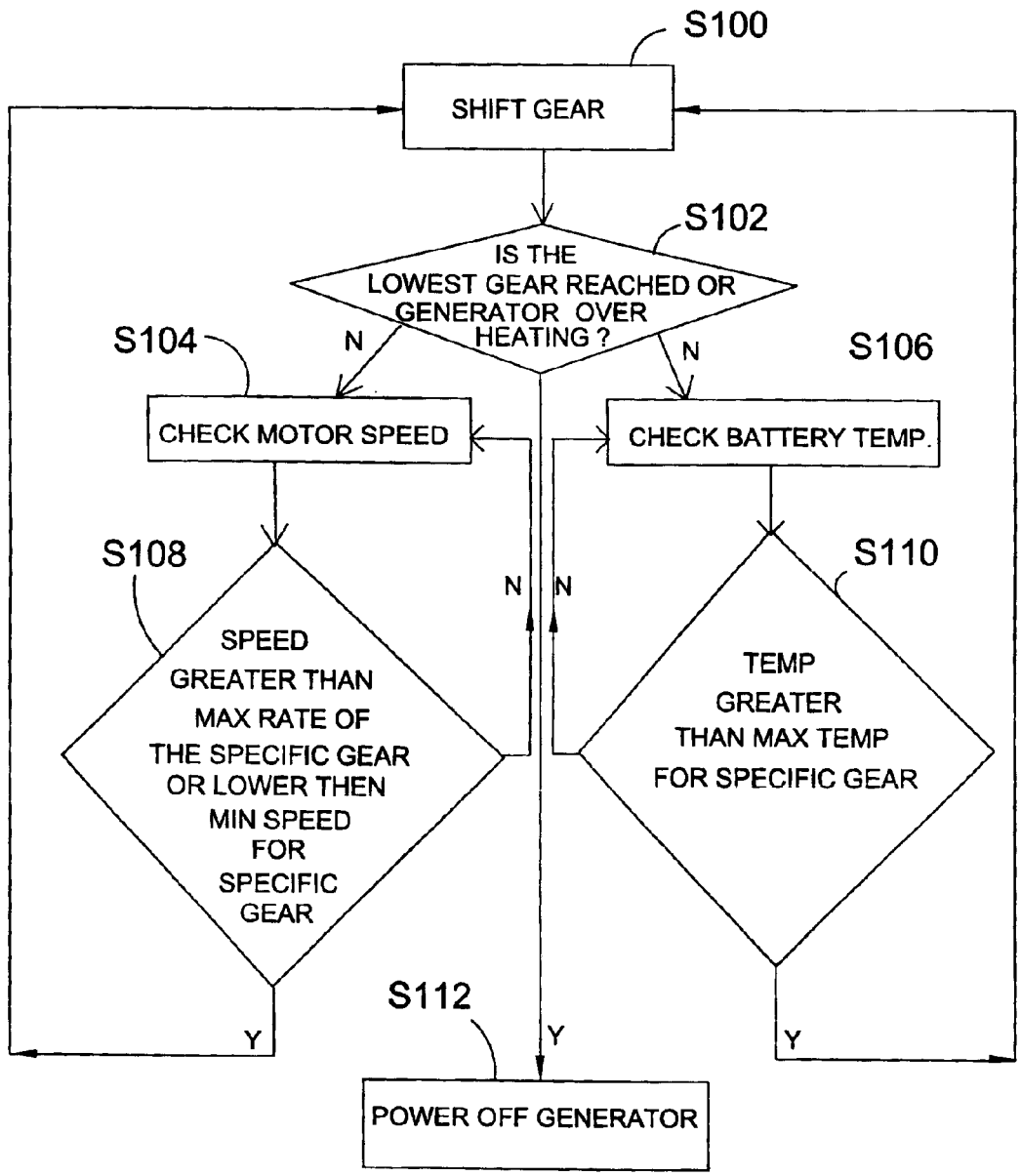
FIG. 8 is a flow chart showing operation of the speed and temperature sensing mechanisms of the portable wind power apparatus of the present invention.

FIG. 8 is a flow chart discussing the operation of the speed and temperature sensing mechanisms of the portable wind power apparatus of the present invention. The feedback control device as shown in FIG. 7 is operative when the vehicle is in motion. Firstly, the vehicle is shifted into gear as shown in step S100. Thereafter, the feedback control device begins to check the speed and temperature of the motor as shown in step S102. If either the lowest gear is reached or the generator is overheating, then the device causes the generator to be powered off as shown in step S112. If the vehicle is not overheating or operating in the lowest gear, the device simultaneously checks both the speed of the motor as shown in step S104 and the temperature of the generator as shown in step S106. If, upon checking the speed of the motor in step S104, the speed of the motor is greater than the maximum rate for that specific gear, or lower than the minimum speed for that specific gear, as discussed in step S108, the device returns to step S100 and causes the gear to be shifted. If the speed is greater than the maximum speed for that specific gear the device causes the gear to be shifted into a higher gear. If the speed is lower than the minimum speed for that specific gear, the device causes the gear to be shifted into a lower gear in step S100. Upon checking the temperature of the generator as discussed in step S106, if the generator temperature is greater than the maximum temperature for that specific gear as stated in step S110, then the device causes the gear to be shifted as in step S100. If the device determines from step S108 that the gear need not be shifted the, the device continues to check the speed of the motor as shown in step S104 until a gear shift is determined required. Also, if the device determines from S110 that the gear need not be shifted as in step S100, the device continues to check the temperature of the generator as shown in step S106 until a gear shift of S100 is required.

Figure 9:
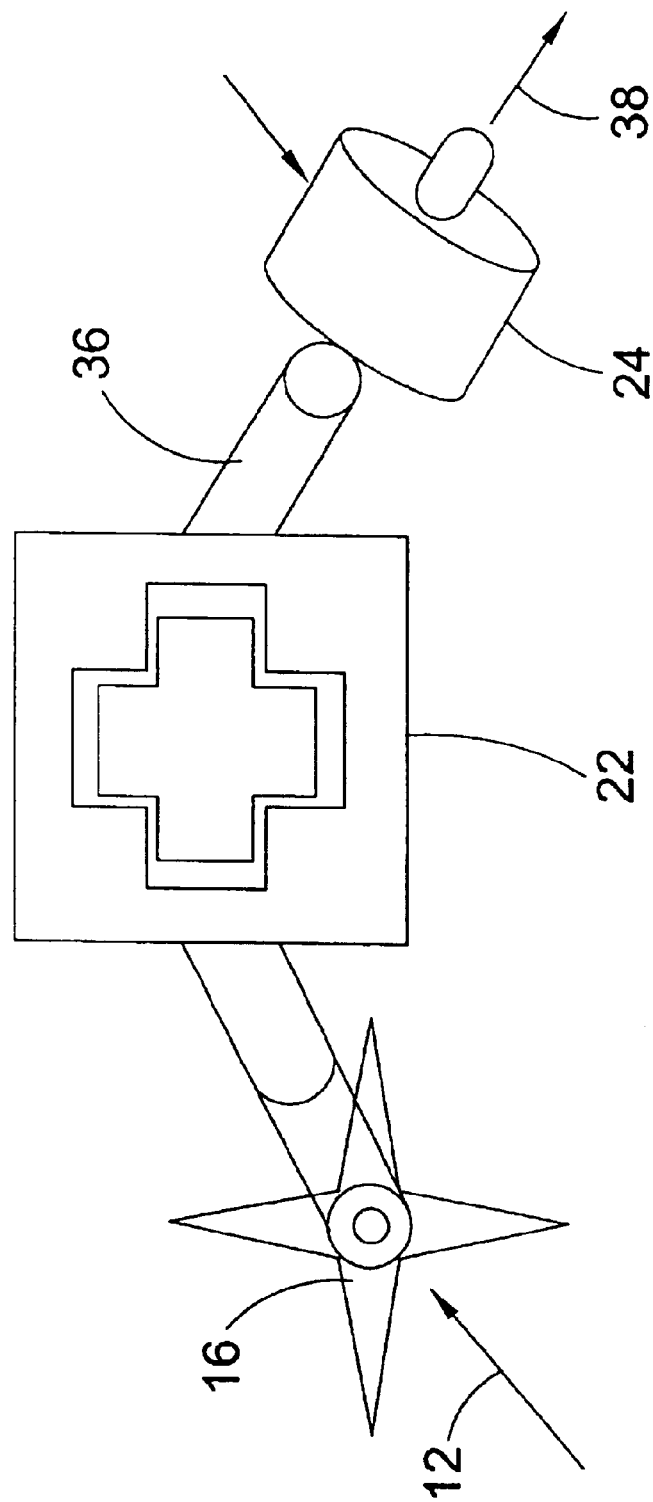
FIG. 9 is a illustrative view of generator of the portable wind power apparatus producing current for powering the vehicle and recharging the power cells contained therein.

FIG. 9 is a illustrative view of generator of the portable wind power apparatus producing current for powering the vehicle and recharging the power cells contained therein. Shown is the wind 12 contacting the wind turbines 16 of the vehicle and causing the wind turbines 16 to rotate as is shown in FIG. 4. Upon rotation of the turbines 16, the energy of the wind is converted into rotational energy. The vehicle includes a gear box 22 connected between the generator 24 and the wind turbines 16. The rotational energy of the turbines 16 flows through the gear box 22 and causes the rotor 36 of the generator 24 to be rotated. Alternatively, the gear box 22 can be used to control the rotational speed of the rotor 36. Rotating the rotor 36 causes a current to be induced in the rotor 36 of the generator 24 thereby converting the rotational energy into electrical energy.

Figure 10:
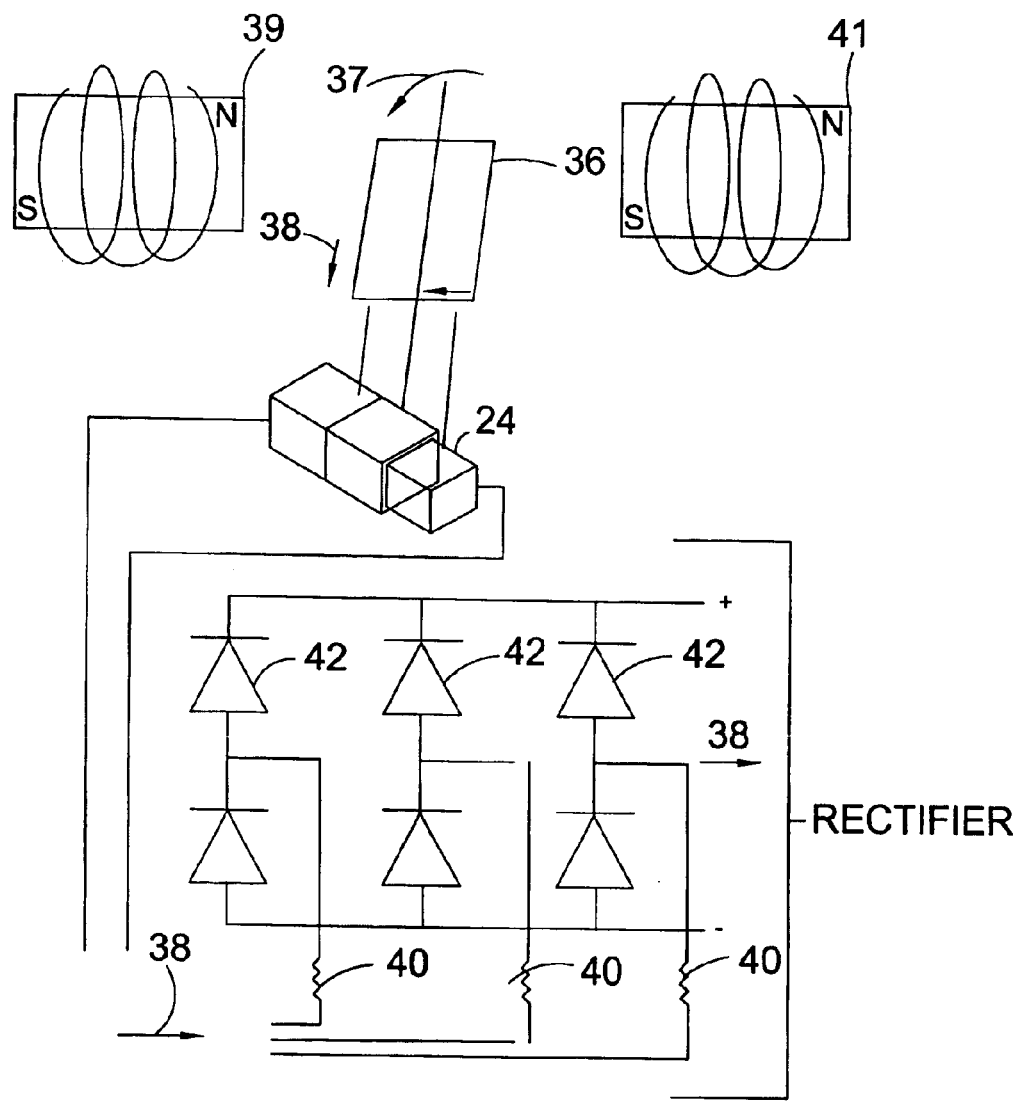
FIG. 10 is an electrical diagram of generator of the portable wind power apparatus of the present invention for generating current for powering the portable wind power apparatus and recharging the power cells contained therein.

FIG. 10 is an electrical diagram of the generator using the rotational energy of the wind turbines 16 to generate a current for powering the portable wind power apparatus and recharging the power cells contained therein. The rotor 36 is shown positioned between a first magnet 39 and a second magnet 41. The first magnet 39 is oriented with its north pole adjacent to the rotor 36 and the second magnet 41 is oriented with its south pole adjacent to the rotor 36 on a side of the rotor 36 opposite the first magnet 39. However, the first magnet 39 can be oriented with its south pole adjacent to the rotor 36 and the second magnet can be oriented with its north pole adjacent to the rotor 36. Preferably, the magnets 39 and 41 are electromagnets. When the rotor 36 is caused to rotate in a direction indicated by the arrow labeled with the numeral 37 an electrical current is caused to flow therethrough. A magnetic field produced by opposite poles of the magnets 39 and 41 cause the current indicated by the arrow labeled 38 to be induced to flow through the rotor 36. The current 38 flows through the stator to a distribution point where it is distributed to a plurality of phase generators 40. The phase generators 40 are connected in series with a plurality of charging diodes 42 of the battery charger 26 which are used to recharge the batteries of the vehicle so that the vehicle and all systems within the vehicle can be operated properly.

Figure 11:
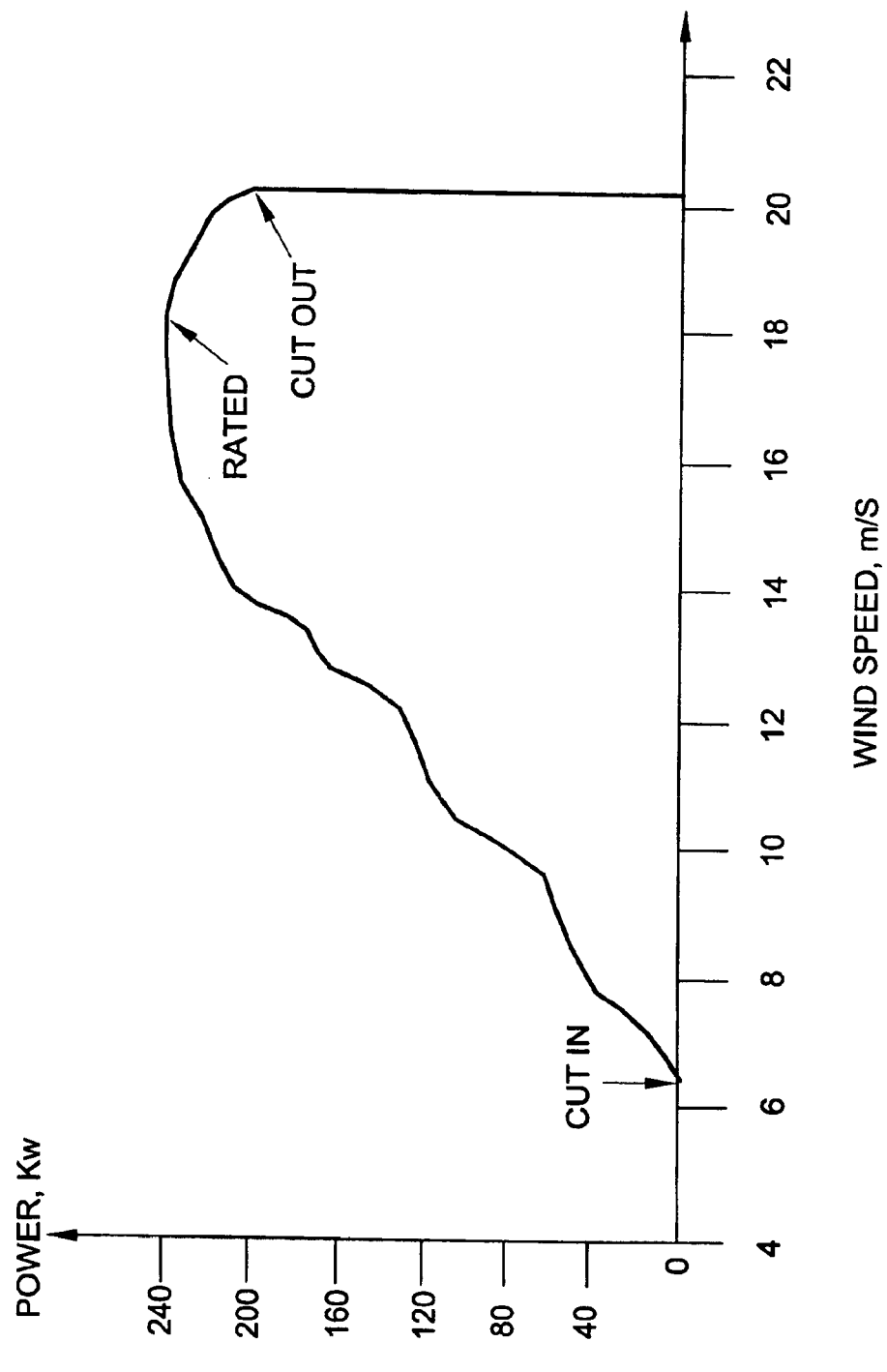
FIG. 11 is a line graph showing the relationship between the speed of the wind and how much current can be produced from rotating a wind turbine at specific wind speeds.
Figure 12:
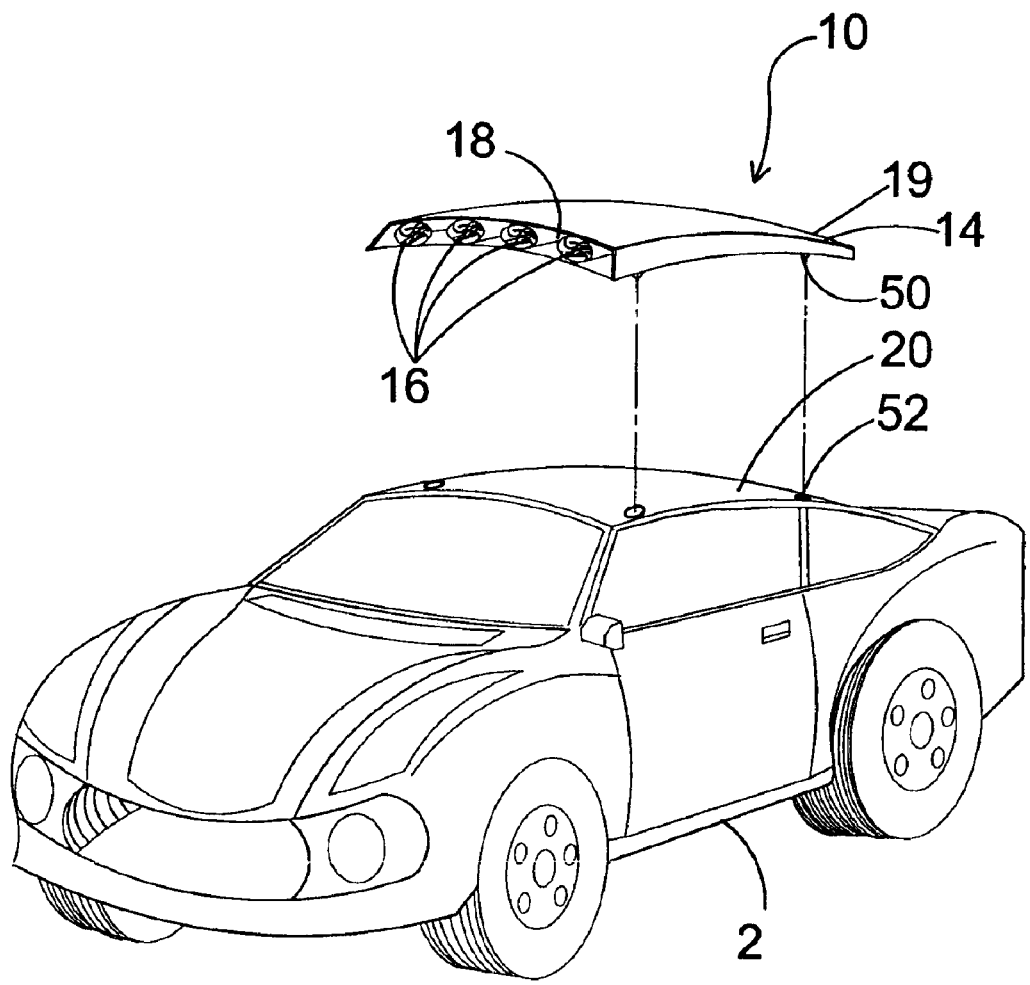
FIG. 12 is a exploded view of the portable wind power apparatus selectively connectable to the roof of an electric vehicle.

FIG. 11 illustrates a line graph showing the relationship between the speed of the wind and the amount of current able to be produced from rotating a wind turbine at specific wind speeds. The graph illustrates the typical energy production garnered from a wind based power source. This graph is provided for purposes of example and the actual amount of energy produced by conversion is determined based on the amount of wind speed encountered by a vehicle having the apparatus connected thereto.

The amount of power generated by the wind can be determined using the equation $$P=(p)(\tfrac{2}{3}\ast d)^2(U^3),$$

where P is the power of the wind, p is the air density (where for purposes of this example is at sea level and 15 degrees Celsius) at 1.22 kg/m³, D is the diameter of the rotor disk, and U is the wind velocity. For example, if the diameter of the rotor disk is 0.5 m and the wind velocity is 30 MPH or 13.3 m/s, the wind power (P) would be 322.63 kilowatts. Thereafter, P must be multiplied by a corresponding power coefficient (Cp). Therefore, if the power coefficient (Cp) equals 0.5926, then the wind power (P), assuming a wind turbine having no loss, is 191.19 kilowatts. During power conversion of the rotational energy to electrical energy 50% is lost to heat, thereby causing 95.6 kilowatts of wind power (P) to be produced. The conversion of rotational energy into 95.6 kilowatts of electrical energy or power is sufficient for powering an electric vehicle as well as recharging batteries contained therein.

The above description is provided for example only, and should not be construed to indicate a maximum or minimum amount of power produced by the apparatus 10 of the present claimed invention. Nor does it indicated a specific level of power which is required to operate an electric vehicle. The amount of electrical energy obtained by conversion relies on a number of variable factors and thus may vary based upon the actual device and circumstances of its use.

FIG. 12 is an exploded view of the portable wind power apparatus selectively connectable to the roof of an electric vehicle. The vehicle 2 is shown being outfitted with the portable wind power apparatus 10 of the present invention. The roof 20 of the vehicle 2 is shown having connection ports 52 for receiving corresponding connectors 50 positioned on an underside of the housing 14 of the apparatus 10. The connectors of the apparatus 10 are aligned with the connection ports 52 positioned on the roof 20 of the vehicle 2. Thereafter, upon connection with the connection ports 52 the apparatus 10 is firmly secured to the roof 20 of the vehicle 2 thereby preventing the apparatus from disengaging the vehicle 2 during operation thereof.

Upon connection of the apparatus 10 to the roof 20, the vehicle can be driven thereby causing wind to pass through the opening 18 of the housing 14 and contact the wind turbines 16. The turbines 16 are caused to rotate and electrical energy is produced in the manner discussed with specific reference to FIGS. 5–10.

From the above description it can be seen that the portable wind power apparatus of the present invention is able to overcome the shortcomings of prior art devices by providing an apparatus that includes wind turbines within a housing positioned atop a roof of a vehicle. Upon driving the vehicle the wind causes the wind turbines to rotate whereby the rotational energy is changed into electrical energy which is used to power an electric vehicle and to recharge the batteries of the electric vehicle. Additionally, the apparatus can be formed integrally with the vehicle or can be selectively removable from the vehicle.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for converting wind energy into electrical energy comprising:
   a) a wind turbine positioned on the vehicle;
   b) a generator positioned within the vehicle and connected between said wind turbine and systems of the vehicle wherein, when the vehicle is in motion, wind causes said wind turbine to rotate, said generator converting rotational energy into electrical energy, said electrical energy being provided to power the systems of the vehicle;
   c) a means for housing said wind turbine with said generator having a first opening and a second opening, wherein said wind turbines are positioned within and at said first opening of said housing, whereby when the vehicle is in motion, wind flows through said first opening causing said wind turbines to rotate, and continues through said housing and out said second opening.

2. The device as recited in claim 1, wherein said housing is integrally formed with the vehicle.

3. The device as recited in claim 1, wherein said housing is selectively removeable from a frame of the vehicle.

4. The device as recited in claim 1, further comprising a gear box connected between said wind turbine and said generator for controlling a speed of said generator thereby regulating the conversion of the rotational energy into electrical energy.

5. The device as recited in claim 4, further comprising:
   a) a rotor connected to said gear box;
   b) a first magnet positioned adjacent to said rotor on a first side thereof; and
   c) a second magnet positioned adjacent to said rotor on a side opposite said first rotor, wherein said gear box rotates said rotor between said first magnet and said second magnet whereby a magnetic field produced by said first and second magnets induces a current to flow through said rotor.

6. The device as recited in claim 4, further comprising:
   a) a rotor connected to said wind turbine;
   b) a first magnet positioned adjacent to said rotor on a first side thereof; and
   c) a second magnet positioned adjacent to said rotor on a side opposite said first rotor, wherein said wind turbine rotates said rotor between said first magnet and said second magnet whereby a magnetic field produced by said first and second magnets induces a current to flow through said rotor.

7. The device as recited in claim 5, further comprising a battery charger and at least one battery set connected between said battery charger and the electrical systems of the vehicle, wherein said battery charger receives rectified current generated by said generator for recharge said at least one battery.

8. The device as recited in claim 5, wherein the gearbox controls a rotational speed of said rotor.

9. The device as recited in claim 5, wherein said device includes an inverter connected to said generator and an induction motor connected to said inverter, said inverter inverting DC current flowing through said rotor to AC current for providing power to said induction motor for driving a driving wheel of the vehicle.

10. The device as recited in claim 5, wherein said device includes a DC motor connected to said generator, wherein said current flowing through said rotor is provided to said DC motor for driving a driving wheel of the vehicle.

11. The device as recited in claim 9, wherein said device further comprises a sensing control system connected between said induction motor and said gear box for selectively sensing a temperature and a speed of said in duction motor of the vehicle.

12. The device as recited in claim 10, wherein said device further comprises a sensing control system connected between said DC motor and said gear box for selectively sensing a temperature and a speed of said DC motor of the vehicle.

13. The device as recited in claim 1, wherein said device further comprises a plurality of wind turbines.

14. The device as recited in claim 1, wherein said wind turbine is positioned on at least one of a roof of the vehicle, a hood of the vehicle, an undercarriage of the vehicle, and within a front end the vehicle.

15. The device as recited in claim 12, wherein said plurality of wind turbines are positioned on at least one of a roof of the vehicle, a hood of the vehicle, an undercarriage of the vehicle, and within a front end the vehicle.

16. A method of converting wind energy into electrical energy comprising the steps of:

a) placing the vehicle in motion;

b) rotating wind turbines positioned on the vehicle by wind impacting thereon;

c) rotating a rotor of a generator positioned between two magnets rotationally connected to the wind turbines thereby causing a current to flow in the rotor of a generator of the vehicle; and d) providing said rectified current to power all electrical systems connected to the generator;

c) providing a means for housing said turbine and said generator attached to said vehicle.

17. The method as recited in claim 16, further comprising the step of providing current to recharge a battery connected to the generator.

18. The method as recited in claim 16, further comprising the step of controlling the rotation of the rotor of the generator with a gear box connected to the generator.

19. The method as recited in claim 18, further comprising the steps of sensing the battery temperature of a charger cell by a controller for determining if the batteries are fully charged; and disengaging the charge upon determining the batteries are fully charged.

\* \* \* \* \*